United States Patent [19]
Jolivet

[11] Patent Number: 5,230,526
[45] Date of Patent: Jul. 27, 1993

[54] BOAT TRAILERS FOR ALL-TERRAIN VEHICLES

[76] Inventor: René Jolivet, 7, 79 ième avenue est, Blainville, Qc, Canada, J7E 1V4

[21] Appl. No.: 890,728

[22] Filed: Jun. 1, 1992

[51] Int. Cl.⁵ .............................................. B63C 13/00
[52] U.S. Cl. ................................. 280/414.2; 280/491.3
[58] Field of Search ............... 280/414.1, 414.2, 491.1, 280/491.3

[56] References Cited

U.S. PATENT DOCUMENTS

| | | | |
|---|---|---|---|
| 1,223,093 | 4/1917 | Nelson | 280/491.3 X |
| 2,970,846 | 2/1961 | Boston | 280/414.2 X |
| 4,300,252 | 11/1981 | Montooth | 280/414.2 |
| 4,398,742 | 8/1983 | Sanders | 280/491.3 |
| 4,611,820 | 9/1986 | Massey, Sr. et al. | 280/414.2 |
| 4,822,065 | 4/1989 | Enders | 280/414.2 X |

FOREIGN PATENT DOCUMENTS

| | | | |
|---|---|---|---|
| 0219439 | 3/1985 | Fed. Rep. of Germany | 280/414.1 |
| 1063567 | 3/1967 | United Kingdom | 280/414.1 |

*Primary Examiner*—Margaret A. Focarino
*Assistant Examiner*—Victor E. Johnson
*Attorney, Agent, or Firm*—Antoine H. Gauvin

[57] ABSTRACT

This trailer has a hitch and a portable wheel assembly. The hitch is a straight, unyielding arm. One end of the arm is to be fastened to the bottom and along the keel and near the front end of the boat. The arm at its other end is to be coupled to an all-terrain vehicle. The separate wheel assembly has a rectangular base with short opposite lateral sides and opposite longitudinal sides. Each of the opposite lateral sides of the base has a short upward extension to confine a portion of the sides of the boat. A wheel is mounted on each of the lateral sides of the base about a stub axle fixed to the base. Straps attach the lateral sides of the base to hold the boat against the base.

14 Claims, 2 Drawing Sheets

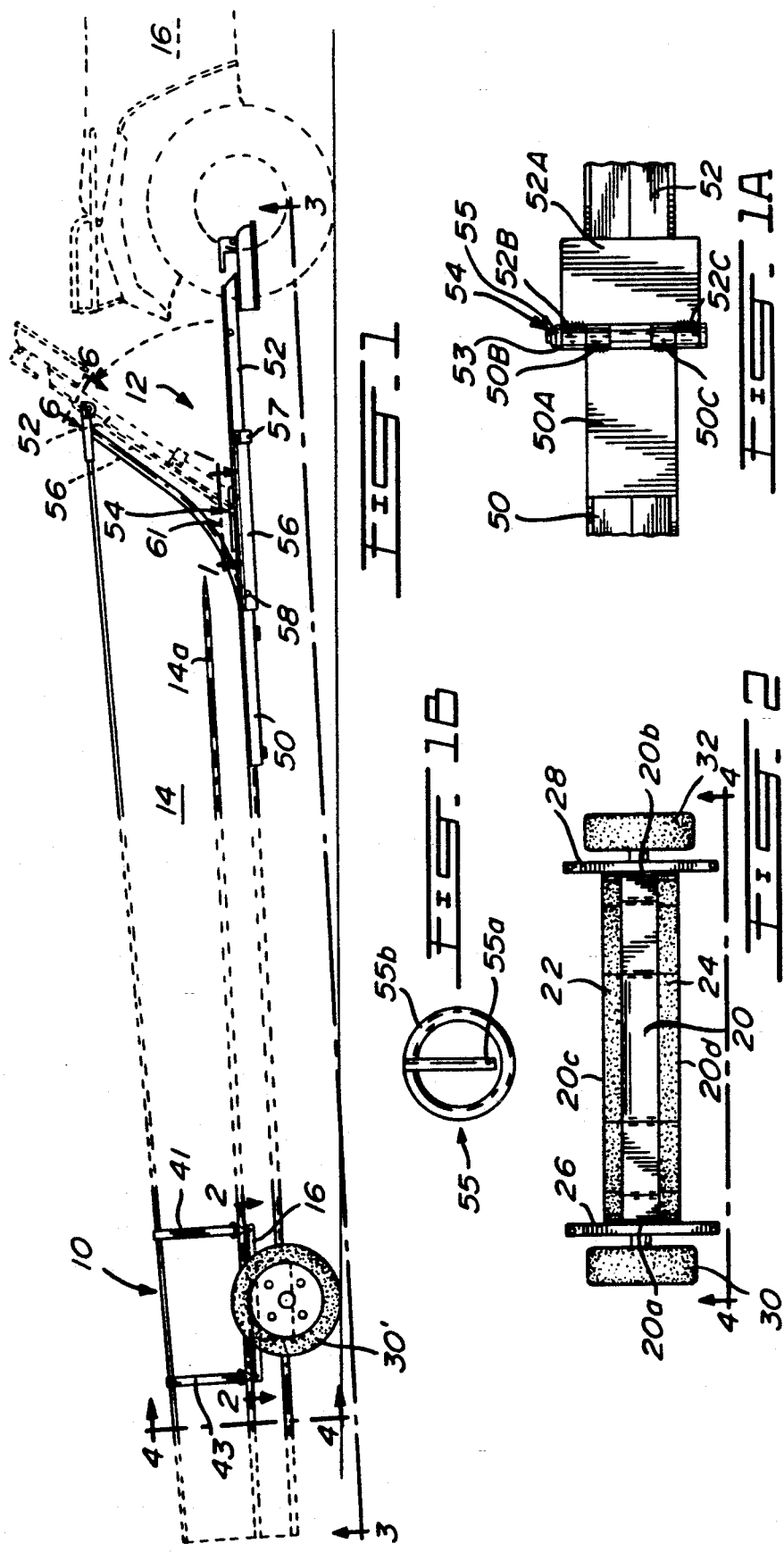

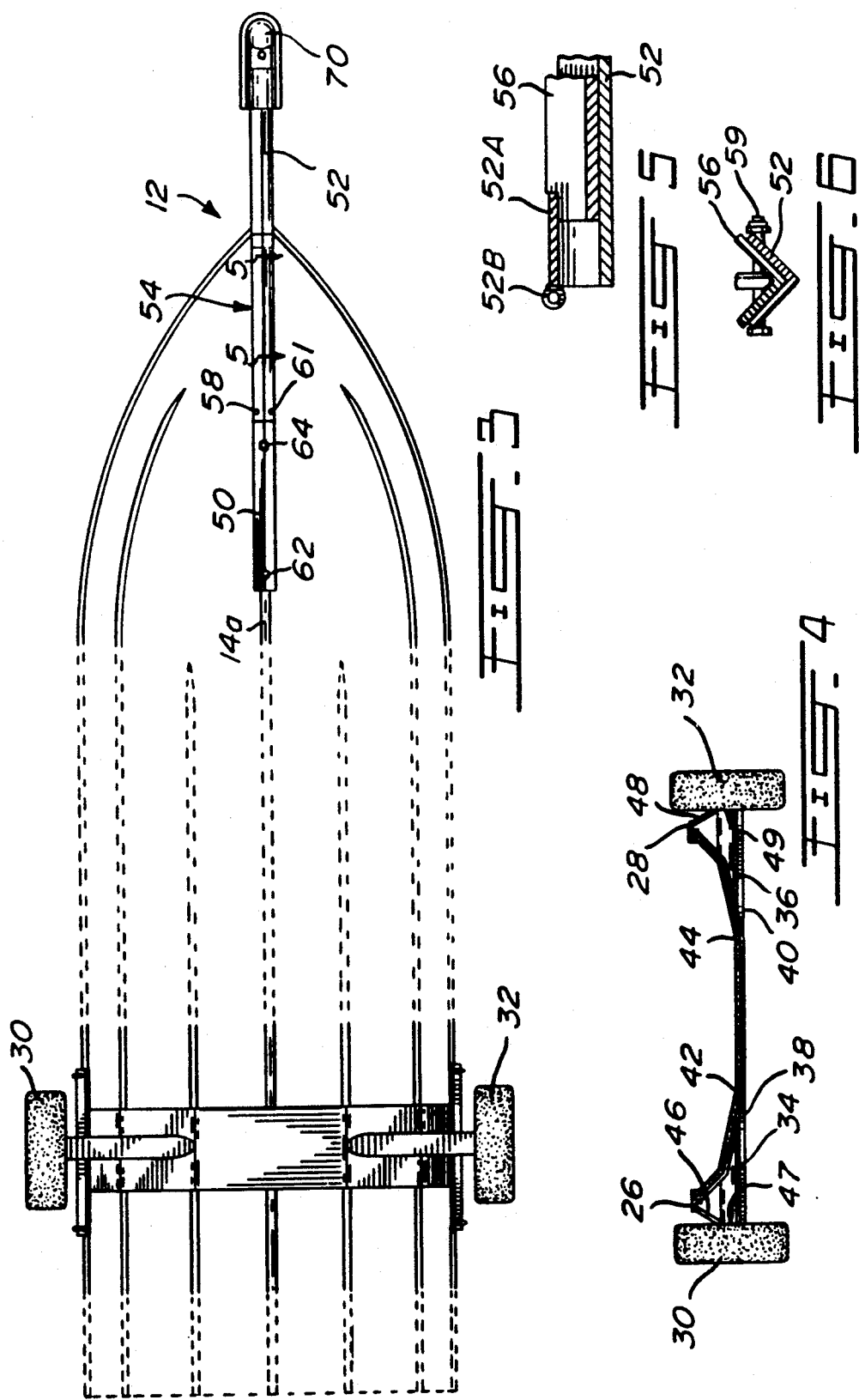

BOAT TRAILERS FOR ALL-TERRAIN VEHICLES

BACKGROUND OF THE INVENTION

1. Field of the invention

This invention relates to a two-component trailer for pulling a boat with an all-terrain vehicle such as a 4×4 moto and the like, through bushes along unlevel narrow and tortuous paths and where stones and tree branches are often present and where a 4×4 truck has no access.

More particularly, this invention relates to a removably mounted separate wheel assembly to be rapidly strap-mounted near the rear end of the boat for receiving the bottom of said boat at said rear end, and a hitch to be mounted under and along the front end longitudinal axis of the boat and particularly of a fishing boat loaded with fishing equipment, while minimizing bores in the boat and being critical of their location.

2. Description of related art

As far as applicant is aware there is no trailer for pulling boats with all-terrain vehicles such as four-wheel-drive off-road vehicle, through bushes along unlevel, narrow and tortuous paths where stones and tree branches are often present.

Seiter teaches, in U.S. Pat. No. 1,939,863 dated Dec. 19, 1933, a two-wheeled boat trailer for a car. Aside from the bores for the hitch, 3 others are required on each side of the boat. Because of coil springs, the boat would be propelled in all directions, hitting stones and perforating its bottom. The boat would scratch the road when an all-terrain vehicle starts its motion, because of the location of the hitch.

Mosier teaches, in U.S. Pat. No. 2,540,279 dated Feb. 6, 1951, a two-wheeled boat trailer for a car wherein the wheels are suspended with a pipe over the boat. Each of the wheels is mounted in sandwich at one end of a pair of arms. The other ends of the pair of arms are provided with bores to receive the pipe. Since the arms are continuously rotating about the pipe, they will rapidly wear out. The hitch defined by a steel cable, is able to pull but unable to damp the erratic motions that one is confronted with in bushes along unlevel narrow and tortuous paths and where stones are often present. The front end of the boat would hit the back end of the all-terrain vehicle and be damaged.

Bonfieti teaches in U.S. Pat. No. 2,562,596 dated Jul. 31, 1951, another two-wheeled boat trailer for a car. The wheels are not close enough to the rear of the boat to prevent the back end of the boat from hitting the road. Furthermore there are at least 12 bores required for holding the trailer.

Wasserlein teaches, in U.S. Pat. No. 2,622,893 dated Dec. 23, 1952, a two-wheeled boat trailer for a car, the wheels being positioned about midpoint. The weight distribution would favour frequent jamming, be uncomfortable for the driver and an off road vehicle difficult to direct. Numerous bores are also required for fastening the trailer.

Wilson teaches, in U.S. Pat. No. 2,688,494 dated Sep. 7, 1954, a two-wheeled boat trailer for a car, the wheel-system would easily bump into the obstacles found along the road.

Borchers teaches, in U.S. Pat. No. 2,909,378 dated Oct. 10, 1959, a two-wheeled boat trailer for a car, which would require numerous bores through a boat aside from relatively high manufacturing costs to produce it.

Engnell teaches, in U.S. Pat. No. 2,966,368 dated Dec. 27, 1960, a two-wheeled boat trailer for a car which is unstable, having a high center of gravity. Also the wheel gap is too narrow for maintaining stability.

Williams teaches, in U.S. Pat. No. 2,967,719 dated Jan. 10, 1961, a one-wheeled boat trailer for a car, which is too unstable to hook to a off-road vehicle and to support a fishing boat loaded with fishing equipment. The boat would turn around the off-road vehicle.

Rued teaches, in U.S. Pat. No. 3,337,243 dated Aug. 22, 1967, a two-wheeled boat trailer for a car, which requires that the boat be turned upside down and thereby does not allow the boat to be loaded with fishing equipment.

Welton teaches, in U.S. Pat. No. 4,344,635 dated Aug. 17, 1982, a two-wheeled boat trailer for a truck, which has a hitch not having the stiffness required for all-terrain vehicles to have access through bushes along unlevel narrow and tortuous paths and where stones and tree branches are often present.

SUMMARY OF THE INVENTION

Broadly stated the invention is directed to a two-component trailer for pulling a boat with an all-terrain vehicle, said boat having a front and a rear end, sides, a bottom, and extending along the bottom at its center and parallel to said sides, a longitudinal axis, said two-component trailer having a hitch and a portable removably mounted separate wheel assembly to be strap-mounted near the rear end of the boat for receiving the bottom of said boat near said rear end, said hitch being a straight, unyielding arm member, said arm member having one end and an opposite end, said one end of said arm member to be fastened to the bottom and along the longitudinal axis of the bottom and near the front end of the boat, said opposite end of said arm member being provided with means for coupling to an all-terrain vehicle, said separate wheel assembly comprising:

a base for receiving the bottom near said rear end of said boat, said base having opposite lateral sides and opposite longitudinal sides, said base having said opposite lateral sides shorter than said opposite longitudinal sides, each of said opposite lateral sides of said base having an upward extension to confine therebetween at least a portion of the sides of the boat near the rear end of the boat, on each of the lateral sides of said base, a stub axle mounted on said base, on each of said stub axles, a wheel rotatably mounted about said stub axle, for each of said wheels, a side and an upper auxiliary retaining supporting bracket cooperating with said stub axle in order to maintain said stub axle in a given position, said wheel being of a dimension sufficient to ride over tree branches, detachably attaching strap means to bridge one of said lateral sides of said base to the other of said lateral sides of said base and thereby to sandwich said boat between said strap means and said base to hold said boat on said base solely with said strap means, whereby said boat may be loaded and displaced through bushes along unlevel and tortuous paths and where damping of the erratic motions that one is confronted with in bushes along unlevel narrow and tortuous paths and where stones are often present, is obtained with the straight, unyielding arm member, its position on said bottom of said boat and the position of said boat on said base and the structure of said base.

The separate wheel assembly may be easily and rapidly removed and even placed in said boat.

Yet this two-component trailer is simple, effective, quick to install, light in weight (may be less than 100 lbs), while the manufacturing cost is relatively inexpensive.

BRIEF DESCRIPTION OF THE DRAWINGS

Referring now to the drawings which illustrate a preferred embodiment of the invention:

FIG. 1 is a side view of a two-component trailer for pulling a boat with an all-terrain vehicle;

FIG. 1a is a top view taken along line 1—1 of FIG. 1;

FIG. 1b is an enlarged view of the lock pin 55 of FIG. 1a;

FIG. 2 is a top view of the separate wheel assembly taken along line 2—2 of FIG. 1;

FIG. 3 is a bottom view along line 3—3 of FIG. 1;

FIG. 4 is a view along line 4—4 of FIG. 2;

FIG. 5 is a cross-sectional view taken along line 5—5 of FIG. 3;

FIG. 6 is a cross-sectional view taken along line 6—6 of FIG. 1.

DETAILED DESCRIPTION OF SOME OF THE PREFERRED EMBODIMENTS OF THE INVENTION

In FIG. 1, a trailer having two-components 10 and 12 pulls a boat 14 with an all-terrain vehicle represented as a four-wheel-drive off-road vehicle 16. The first of said two-components 10 is a removably mounted separate wheel assembly comprising a base 20, better shown on FIG. 2, for receiving the bottom rear end of the boat 14, which may be conveniently a steel plate having mounted thereon rubber cushions or bands 22, 24 to protect the bottom of the boat from scratches as well as to receive the curves of said bottom.

The base has opposite lateral sides 20a, 20b, and opposite longitudinal sides 20c 20d.

Each of the opposite lateral sides has an upward extension to confine therebetween at least a portion of the longitudinal sides of the boat. This may conveniently be obtained with the lateral sides of the base, each being bent to be upwardly inclined in the shape of the bottom of the boat as shown in FIG. 4 and terminating with an angle iron 26, 28 each fixedly mounted along one of the opposite lateral sides of the base such as by soldering, riveting, nuts and bolts or other fastening means. In a particular and preferred embodiment the angle irons 26, 28 terminate under the outwardly projected ribs such as 14a of a boat 14, for said ribs to rest on said angle irons.

A rubber-tire wheel, respectively 30, 32, (better shown in FIG. 4) is rotatably mounted with ball bearings on each of the lateral sides of the base about a dead stub axle 34, 36 adjacent to the base and soldered thereto or fastened by other means. Each of said stub axle 34, 36 is provided with a wheel frame including flange. Side auxiliary retaining supporting brackets 38, 40 are each respectively hooked at one of their ends in slots 42, 44 provided therefor in the base, and with a linking pin to a wheel connecting bracket 47, 49 each fixed to a wheel frame. Upper auxiliary retaining supporting brackets 46,48 are secured at one of their ends to the angle irons 26, 28 and at their other end to the stub axles 34,36.

In a preferred embodiment, the angle irons 26, 28 may thus terminate short or in recess of the surface of the tires.

The wheels are of a dimension sufficient to ride over tree branches and are generally of trailer type.

Strap means to detachably attach each of said lateral sides to sandwich said boat in between said strap means and said base may have various shapes such as band-,wire,rope but is preferably of leather, textile or plastic type strap. At least one strap is used, preferably two straps, (such as shown at 41, 43), or more. These straps are detachably attached to the base 20 and preferably to the angle irons 26, 28, for instance with S-shaped hooks, shackles and the like through bores or slots in the angle irons 26,28.

Thereby a boat may be loaded and displaced through bushes along unlevel and tortuous paths and said separate wheel assembly may be easily and rapidly removed and even placed in the boat.

The second of said two-components 12, better shown in FIG. 3, is a hitch which is an unyielding arm member, to be fastened to the bottom and along the longitudinal axis of the bottom and near the front end of the boat for coupling to an all-terrain vehicle and damping the erratic motions that one is confronted with in bushes along unlevel, narrow and tortuous paths and where stones are often present, preferably as a straight arm member. The term "unyielding" arm member is understood to mean, throughout the disclosure and claims, a "stiff" arm member.

In a preferred embodiment, it is an articulated straight arm, as shown in FIGS. 1, 1A and 5, for instance two angle irons 50, 52 defining a first and a second arm portion are pivotally mounted about pivot 54, preferably a quickly removable pivot provided with a lock-pin 55 better shown in FIG. 1B, wherein the pin 55a, with or without a washer 53, is inserted into the end of the pivot 54 and the ring 55b is rotated. At the end of the pivot 54, the pin 55a is spring loaded to urge the ring 55b in the same plan as the ring 55b. Spring-loaded and accordion-divided lock-pins and the like may be used. The angle iron 50 may be fastened to the kill of the boat and may even reinforce the keel.

When the angle irons 50, 52 are in a horizontal position as shown in FIGS. 1, 5 and 6, a locking angle iron 56 is used to superimpose a portion of the angle iron 52 near the end portion adjacent the pivot and to releasably hold them together as well as to superimpose and to releasably hold a portion of the angle iron 50 near its end portion adjacent the pivot.

In a preferred embodiment, the first angle iron 50, at its end adjacent the second angle iron 52, defines an inner hinge portion comprising a wall 50a fixed to the free edge of the walls of the first angle iron 50 as to define a triangular end or cross-section, and outwardly projecting and in the same plane as said wall fixed to the free edge of the walls and of said triangular end, a pair of eyes 50b, 50c (better shown in FIG. 1A) for said inner hinge portion.

The second angle iron 52 at its end nearest to said first angle iron 50 has a plate 52a fixed to the free edge of the walls of said second angle iron as to define a triangular end or cross-section, and outwardly laterally projecting from said free edge of the adjacent walls and in the same plane as said wall fixed to the free edge of the adjacent walls and of said triangular end, a pair of eyes 52b, 52c, in space relation to said pair of eyes for said inner hinge portion, defining an outer hinge portion to sandwich between said eyes of said inner hinge portion, said eyes receiving the pivot of said hinge.

In a still preferred embodiment, the second angle iron is provided about mid point from its length, with a stub angle iron 57 larger than said second angle iron 52 and fixed thereto as to define between said larger stub angle iron and said second angle iron a space for receiving therebetween and snugly fitting a locking iron angle 56, said locking angle iron being layable over or superimposing a portion of said first and said second iron angles and terminating at one end into said space and at the other end being provided with means for releasably holding said locking angle iron to said first angle iron, and thereby said locking iron acting as said means for releasably holding said angle irons substantially in horizontal position.

One of the means for releasably holding said locking angle iron to said first angle iron is for the locking angle iron 56 to have a slot 58 for a bolt 59, corresponding to a slot 61 in the angle iron 50 to remotely secure these two lock angles together with said lock bolt and a nut and thereby to releasably hold or lock the angle iron 52 firmly in the horizontal position.

If desired, instead of the stub angle iron 57, a slot-and-bolt system may be used to secure the end of the angle iron 56 to the angle iron 52. Other means to hold the hitch in a substantially horizontal position may be used, if desired.

In a preferred embodiment, as shown in FIG. 5, at least one of the ends of the locking angle iron 56 is tapered to ease entering into said space, between said stub angle iron and said second iron angle. Said tapered end or ends of said locking iron angle, may also be inserted into said triangular end of said second angle iron at said near one of its end, the remaining portion of said second angle iron being superimposed upon said walls of said second angle iron on the inside of said second angle iron, the other end of said locking angle iron being provided with a bore and the second angle iron being provided with a corresponding bore for releasably locking said locking angle iron against the inside of said second iron angle, when said first and second iron angles are not locked in a straight position.

The angle iron 50 is mounted over the keel 14a, of the boat with washers and bolts such as shown at 62, 64 or by other fastening means. Thus when one wishes to sell such a boat, the angle iron 50 is easily removed by removing bolts such as shown at 62, 64 and blocking the holes. The free end of the angle iron 52 is connected to a coupling device 70 to engage the coupling ball positioned on the four wheel-drive off road vehicle. Other coupling devices may be used if desired.

Also, though less preferred, the pivot 54 may be positioned to stop short of the angle iron 50 to enable resting thereon of said angle iron 52 when in horizontal position, as well as to provide spacing for a removable locking pin 66 and slots 67, 68 respectively through the angle iron 52 and 50 for securely holding said angle iron 52 in said horizontal position with said pin 66. A second slot 70, with the assistance of said locking pin 66, secures the angle iron 52 when positioned against the front of the boat.

Also, it should be noted that with respect to the hitch defining an unyielding member, said member needs not be an iron angle, and may define a plethora of cross-sections instead; as examples only and without being limited thereto, the cross-sections may be U-shaped, V-shaped, T-shaped, In another embodiment, when the sides of a boat are yielding near the strap means to detachably attach each of the lateral sides of the base of the separate wheel assembly to sandwich said boat in between said strap means and said base of the separate wheel assembly, a strenghtening bar may be used to outwardly push the sides of the boat and thereby counteracting the pressure exerted by the strap means tending to push inwardly said sides of the boat. This may be for instance a 2"×3" beam.

EXAMPLE

In a particular embodiment a steel plate 12"×55"×3/16" was used as the base. The angle irons 26, 28 were 1 ½"×2 3/16". The rubber-tire wheels 30, 32 were 175×13. The two angle irons 50, 52 were 2"×2" and respectively 39" and 33" in length, and the stub angle iron 2 ½"×2 ½". Boats having 12 and 14 feet were successfully used, even 16 but these were more cumbersome to pull in bushes. The angle iron 52 was quickly removable for storage as well as the separate wheel assembly.

While this invention has been described in conjunction with a preferred embodiment thereof, it is clear and obvious from the above description that numerous modifications and changes therein may be made by those skilled in the art without departing from the spirit and scope of this invention as defined by the claims appended hereto.

I claim:

1. A two-component trailer to pull a boat with an all-terrain vehicle,
    said boat having a front and a rear end, sides, a bottom, and extending along the bottom halfway between and parallel to said sides, a longitudinal axis,
    said two-component trailer having a hitch and a portable removably mounted separate wheel assembly to be strap-mounted near the rear end of the boat for receiving the bottom of said boat near said rear end,
    said hitch being a straight, unyielding iron angle arm member, said arm member having one end and an opposite end,
    said one end of said arm member to be fastened to the bottom and along the longitudinal axis of the bottom and near the front end of the boat,
    said opposite end of said arm member being provided with means for coupling to an all-terrain vehicle,
    in a region adjacent to a junction of said bottom and said front end of said boat, said straight arm member, between said one end and said opposite end of said arm member, being sectioned into a first arm portion including said one end and a second arm portion including said opposite end,
    said first arm portion being bridged to said second arm portion with a hinge, said hinge having a pair of flat plates turning about a pivot,
    one of said flat plates of said hinge being fixed to said first arm portion as to define with said first arm portion a triangular cross-section, and the other of said flat plates of said hinge being fixed to said second arm portion as to define with said second arm portion a triangular cross-section, so that said second arm portion may be pivoted in a first position to rest against said front end of said boat and be pivoted in a second position to be in a same plane as said first arm portion, said second arm portion being provided with means to releasably lock said second arm member into said second position to act as said straight arm, said separate wheel assembly comprising:

a base for receiving the bottom near said rear end of said boat, said base having opposite lateral sides and opposite longitudinal sides, said base having said opposite lateral sides shorter than said opposite longitudinal sides, each of said opposite lateral sides of said base having an upward extension to confine therebetween at least a portion of the sides of the boat near the rear end of the boat, on each of the lateral sides of said base, a stub axle mounted on said base, on each of said stub axles, a wheel rotatably mounted about said stub axle, for each of said wheels, a side and an upper auxiliary retaining supporting bracket cooperating with said stub axle in order to maintain said stub axle in a given position, said wheels being of a dimension sufficient to ride over tree branches, detachably attaching strap means to bridge one of said lateral sides of said base to the other of said lateral sides of said base and thereby to sandwich said boat between said strap means and said base to hold said boat on said base solely with said strap means.

2. The two-component trailer to pull a boat with an all-terrain vehicle as defined in claim 5, wherein said pivot of said hinge is provided with a spring loaded lock-pin whereby said second arm portion may be easily connected and disconnected.

3. The two-component trailer to pull a boat with an all-terrain vehicle as defined in claim 1, wherein said second arm portion including said opposite end is provided, about mid point between said opposite end and said hinge, with a stub angle iron larger than said second arm portion and fixed thereto as to define between said stub angle iron and said second arm portion a space for receiving therein and snugly fitting a locking angle iron, a locking angle iron having a one end and another end, said locking angle iron being layable over a portion of said first and said second arm portions and terminating at said one end into said space and at said another end being provided with means for releasably holding said locking angle iron to said first arm portion, and thereby said locking angle iron acting as said means to releasably lock said second arm member into said second position, to act as said straight arm.

4. The two-component trailer to pull a boat with an all-terrain vehicle as defined in claim 3, wherein said means for releasably holding said locking angle iron to said first arm portion is a lock bolt and said first arm portion and said locking angle iron are provided with bores for receiving said lock bolt.

5. The two-component trailer to pull a boat with an all-terrain vehicle as defined in claim 5, wherein said longitudinal axis of the bottom of said boat is a keel.

6. The two-component trailer to pull a boat with an all-terrain vehicle as defined in claim 1, wherein said sides of said boat have a given height and each of said upward extensions of said base are of a height less than half that of said height of said sides of said boat.

7. The two-component trailer to pull a boat with an all-terrain vehicle as defined in claim 1, wherein said sides of said boat at said rear end are inclined and each of said upward extension of said opposite lateral sides of said base are each inclined as said sides of said boat near said rear end, said wheel being a rubber-tire wheel.

8. The two-component trailer to pull a boat with an all-terrain vehicle as defined in claim 1, wherein said upward extension is an angle iron, and said base is a steel plate.

9. The two-component trailer to pull a boat with an all-terrain vehicle as defined in claim 1, wherein said wheel is a rubber-tire wheel.

10. The two-component trailer to pull a boat with an all-terrain vehicle as defined in claim 1, wherein said longitudinal axis of the bottom of said boat is a keel, said upward extension is an angle iron, and said base is a steel plate and said plate is shaped as said bottom of said boat near said rear end.

11. The two-component trailer to pull a boat with an all-terrain vehicle as defined in claim 1, wherein said upward extension of each of said lateral sides is an angle iron, said base is a steel plate and said steel plate is shaped as said bottom of said boat near said rear end, a wheel frame is provided for each of said wheel, having a bracket connected to said wheel frame, and each of said side an upper auxiliary retaining supporting brackets of each of said wheels having respectively a one end and an other end, said side auxiliary retaining supporting brackets of each of said wheels are each respectively hooked at said one end, in said base, and at said other end to said wheel bracket, and said upper auxiliary retaining supporting brackets are secured at said one end to their respective said angle iron defining said upward extension of each of said lateral sides and at said other end to their respective wheel frame.

12. The two-component trailer to pull a boat with an all-terrain vehicle as defined in claim 11, wherein said all-terrain vehicle is a four-wheel-drive off-road vehicle.

13. The two-component trailer to pull a boat with an all-terrain vehicle as defined in claim 3, wherein said one end of said locking angle iron is tapered to ease entering into said space between said stub angle iron and said second arm portion.

14. The two-component trailer to pull a boat with an all-terrain vehicle as defined in claim 1, wherein said one of said flat plates of said hinge being fixed to said first arm portion defines, in the same plane as said one of said flat plates, a pair of eyes outwardly projecting from said one of said flat plates, away from said first arm portion, said pair of eyes defining inner eye openings of said hinge, said other of said flat plates of said hinge being fixed to said second arm portion including said opposite end as to define with said second arm portion a triangular cross-section, defines, in the same plane as said other of said flat plates, a pair of eyes outwardly projecting away from said triangular cross-section and away from said opposite end of said second arm and in the same plane as said other of said flat plates, said pair of eyes, defining outer eye openings of said hinge, whereby said pair of outer eye openings sandwich between said inner eye openings, said eye openings having rotatably mounted therein said pivot, said hinge being such that the plates may be placed between the pivot in a same plane.

* * * * *